United States Patent Office 3,292,308
Patented Dec. 20, 1966

3,292,308
PROCESS OF PRESERVING GRASS SEED
Benjamin S. Goldberg, 5106 Levindale Road,
Baltimore, Md. 21225
No Drawing. Filed Apr. 7, 1965, Ser. No. 446,425
1 Claim. (Cl. 47—58)

This invention relates to specially treated, coated grass seeds and process of making same.

When grass seeds are stored or otherwise kept for varying periods of time, prior to planting, such seeds have a tendency to dehydrate and lose much and at times all of their properties of germination. I have found that, after storage of grass seeds for about a year, as much as 30 percent of the seeds become sterile, lose their fertility and fail to germinate when planted.

Among the objects of this invention is the provision of a method and means for treating the grass seeds to counteract and thereby arrest or reduce such deterioration of their value when in storage and thus preserve their fertility and germinating properties essential for seeding.

A further object of this invention is to provide grass coated seed which may be stored for as much as a year or longer without substantial impairment or loss of germinating properties.

A specific example of practising my invention is as follows:

To 50 pounds of grass seed, such as timothy seed, bluegrass seed, rye grass seed and/or fescue seed there is added 5 to 10 pounds of cotton seed meal and the mixture is agitated thoroughly for several minutes or longer. After this agitation, there is added 2 to 45 pounds of soya bean meal and the resulting mixture is also thoroughly stirred for 5 to 10 minutes or longer. The grass seeds become well coated with a film of the cotton seed meal and soya bean meal, have a longer useful longevity, and may be kept several years without undergoing serious dehydration and destruction of fertility and germinating function. The grass seeds coated with this thin film of the meals sprout more readily.

I claim as my invention:

A process of treating grass seeds comprising coating said grass seeds with cotton seed meal and adding a coating of soya bean meal.

No references cited.

ABRAHAM G. STONE, Primary Examiner.

R. E. BAGWILL, Assistant Examiner.